US011001093B2

(12) United States Patent
McGonigle

(10) Patent No.: US 11,001,093 B2
(45) Date of Patent: May 11, 2021

(54) MOUNTABLE AND SELF-SUPPORTING TRAY AND METHOD OF USING SAME

(71) Applicant: Black Forest Holdings, LLC, Wilmington, NC (US)

(72) Inventor: Eugene J. McGonigle, Wilmington, NC (US)

(73) Assignee: BLACK FOREST HOLDINGS, LLC, Wilmington, NC (US)

( * ) Notice: Subject to any disclaimer, the term of this patent is extended or adjusted under 35 U.S.C. 154(b) by 0 days.

(21) Appl. No.: 16/894,085

(22) Filed: Jun. 5, 2020

(65) Prior Publication Data

US 2020/0384793 A1 Dec. 10, 2020

Related U.S. Application Data

(60) Provisional application No. 62/858,115, filed on Jun. 6, 2019.

(51) Int. Cl.

| | |
|---|---|
| ***B42F 9/00*** | (2006.01) |
| ***B43K 23/00*** | (2006.01) |
| ***B62B 3/14*** | (2006.01) |
| ***B43L 3/00*** | (2006.01) |

(52) U.S. Cl.

CPC ............ *B42F 9/002* (2013.01); *B43K 23/001* (2013.01)

(58) Field of Classification Search

CPC .............................. B42F 9/002; B43K 23/001

USPC ..... 40/124.01, 124.05, 341, 904; 281/44, 45

See application file for complete search history.

(56) References Cited

U.S. PATENT DOCUMENTS

| | | | | |
|---|---|---|---|---|
| 2004/0251289 A1* | 12/2004 | Chretien | B62B 3/1428 | 224/411 |
| 2009/0084924 A1* | 4/2009 | Schuermann | B62B 3/1428 | 248/452 |
| 2010/0139050 A1* | 6/2010 | Kelly | B42F 9/001 | 24/67.5 |
| 2013/0341370 A1* | 12/2013 | Larson | B62B 5/00 | 224/411 |

* cited by examiner

*Primary Examiner* — Justin V Lewis

(74) *Attorney, Agent, or Firm* — Ward and Smith, P.A.; Ryan K. Simmons

(57) ABSTRACT

A mountable tray. The mountable tray may include a main plate having a top surface, a bottom surface, a top edge, a bottom edge spaced apart from and parallel with the top edge, a first side edge, and a second side edge spaced apart from and parallel with the first side edge; an upper edge plate extending downward from at least a portion of the top edge of the main plate bottom surface, wherein the upper edge plate may include a cutout portion formed therein; a support member formed on the bottom surface of the main plate and proximate to the upper edge plate, wherein the support member may be substantially parallel with and spaced a distance apart from the upper edge plate; and a securing mechanism disposed at an upper portion of the top surface of the main plate.

21 Claims, 16 Drawing Sheets

100
112a
116
112b
110
114a
114b

MOUNTABLE AND SELF-SUPPORTING TRAY AND METHOD OF USING SAME

RELATED APPLICATIONS

This application is related and claims priority to U.S. Provisional Patent Application No. 62/858,115, entitled "Mountable and Self-Supporting Clipboard and Method" filed on Jun. 6, 2019 the application of which is incorporate herein by reference in its entirety.

TECHNICAL FIELD

The subject matter of the invention relates generally to a mountable and self-supporting tray for processes requiring manual record-keeping mechanisms and mobility, and more particularly to a mountable and self-supporting clipboard.

BACKGROUND

Certain processes exist that require both manual record-keeping mechanisms and mobility. One example is a warehouse environment in which workers are filling orders. For example, when a warehouse attendant is filling an order, he/she goes around the warehouse with, for example, a U-frame type cart and with a "pick list" (on paper) either loosely in hand or on a standard clipboard. As the warehouse attendant moves around and fills the order, he/she marks things off the pick list. To do so, he/she has to place the paper pick list on something to write on it and/or try to write on it while holding it. Accordingly, handling the paper pick list is cumbersome and often results in slowing down the order fill process, miss fills, papers falling on the floor, and so on. Therefore, what is needed is new approaches to processes that require both manual record-keeping mechanisms and mobility.

SUMMARY

In one embodiment, a mountable tray is provided. The mountable tray may include a main plate having a top surface, a bottom surface, a top edge, a bottom edge spaced apart from and parallel with the top edge, a first side edge, and a second side edge spaced apart from and parallel with the first side edge; an upper edge plate extending downward from at least a portion of the top edge of the main plate bottom surface, wherein the upper edge plate may include a cutout portion formed therein; a support member formed on the bottom surface of the main plate and proximate to the upper edge plate, wherein the support member may be substantially parallel with and spaced a distance apart from the upper edge plate; and a securing mechanism disposed at an upper portion of the top surface of the main plate. The securing mechanism may include one of a clip or a clamp. The tray may further include one or more openings formed through the main plate. The one or more openings may be configured for holding a marking instrument. The marking instrument may include any one of a pen, pencil, marker, highlighter, or stylus. The one or more openings may be disposed at one or both top corner regions of the main plate. The cutout portion may be formed at about a center point of the upper edge plate. The cutout portion may extend laterally an equal distance in opposite directions from the center point of the upper edge plate. The upper edge plate and support member may be configured to install and support the main plate to a separate structure. The separate structure may include a moveable cart. The tray may further include a mounting support disposed on the top surface of the main plate, wherein the mounting support may be configured to secure the clip or clamp to the top surface of the main plate. The mounting support may be disposed at a top portion of the top surface of the main plate. The support member may include one of a generally V-shaped, U-shaped, or box-shaped profile. The one or more openings may substantially align with an inner space formed by a profile of the support member, and wherein the profile of the support member may be configured such that when a marking instrument is placed in the one or more openings it prevents the marking instrument from falling completely through the one or more openings. The upper edge plate and a face of support member that is nearest upper edge plate may be set at an angle in the range of about 30 degrees to about 90 degrees with respect to the plane of the main plate. The support member may include a cutout portion formed at about a center point of the support member. The cutout portion may extend laterally an equal distance in opposite directions from the center point of the support member. The cutout portion of the support member may be substantially the same size and may substantially align with the cutout portion of the upper edge plate. The tray may further include an antiskid pad disposed on at least a portion of the top surface of the main body. The tray may further include a bottom edge end plate extending generally upward from at least a portion of the bottom edge of the main plate top surface. The upper edge plate may include a flared segment at a lower portion of the upper edge plate, and wherein the flared segment flares outward with respect to the plane of upper edge plate. A gap between the flared segment and opposing portion of the support member may be greater in width than a gap between a non-flared segment and opposing portion of the support member.

In another embodiment, a mountable tray is provided. The mountable tray may include a main plate having a top surface, a bottom surface, a top edge, a bottom edge spaced apart from and parallel with the top edge, a first side edge, and a second side edge spaced apart from and parallel with the first side edge; an upper edge plate extending downward from at least a portion of the top edge of the main plate bottom surface, wherein the upper edge plate may include a cutout portion formed therein; and a support member formed on the bottom surface of the main plate and proximate to the upper edge plate, wherein the support member may be substantially parallel with and spaced a distance apart from the upper edge plate.

In yet another embodiment, a method of using a mountable tray is provided. The method of using the mountable tray may include, providing a mountable tray, wherein the mountable tray may include a main plate having a top surface, a bottom surface, a top edge, a bottom edge spaced apart from and parallel with the top edge, a first side edge, and a second side edge spaced apart from and parallel with the first side edge; an upper edge plate extending downward from at least a portion of the top edge of the main plate, wherein the upper edge plate may include a cutout portion formed therein; a support member formed on the bottom surface of the main plate and proximate to the upper edge plate, wherein the support member may be substantially parallel with and spaced a distance apart from the upper edge plate; and a securing mechanism disposed at an upper portion of the top surface of the main plate. The method may further include installing the clipboard to a separate structure, such as a cart, via the upper edge plate and support member.

BRIEF DESCRIPTION OF THE DRAWINGS

Figure 5A:
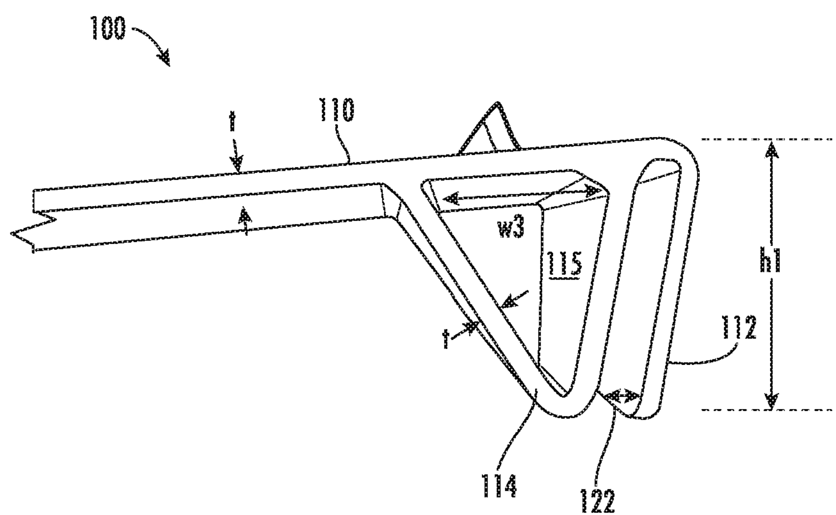
Figure 5B:
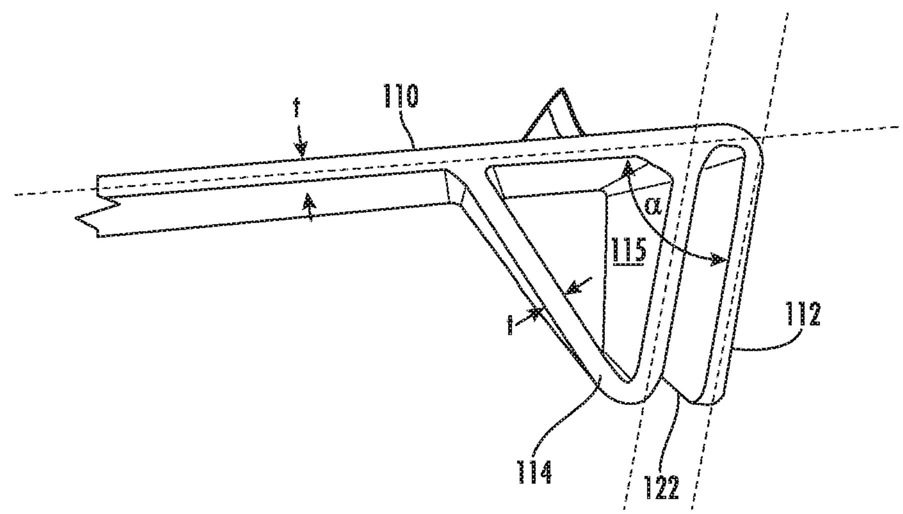
Figure 6:
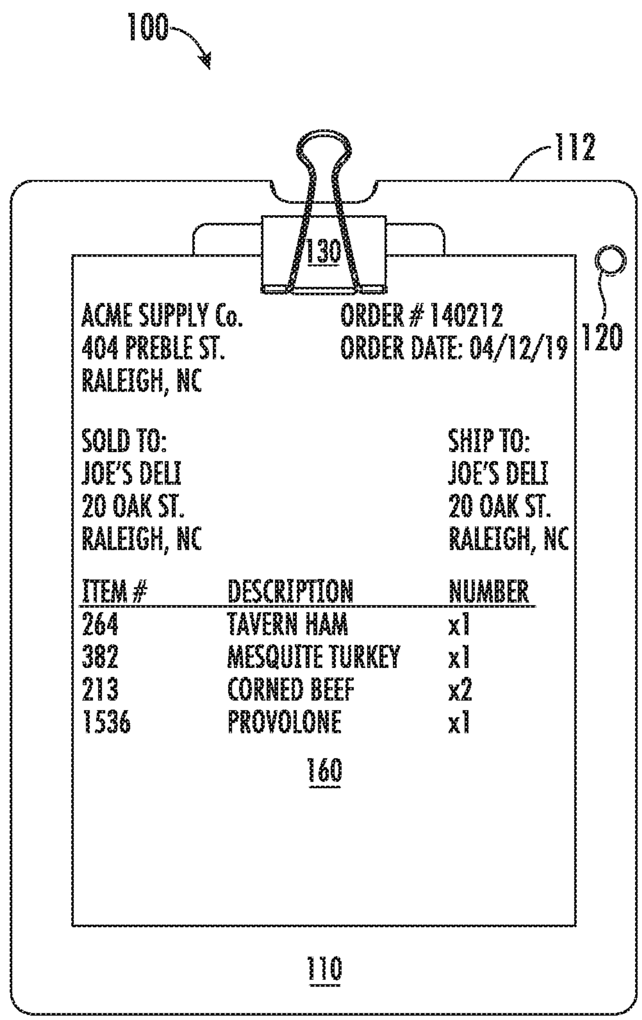
Figure 7:
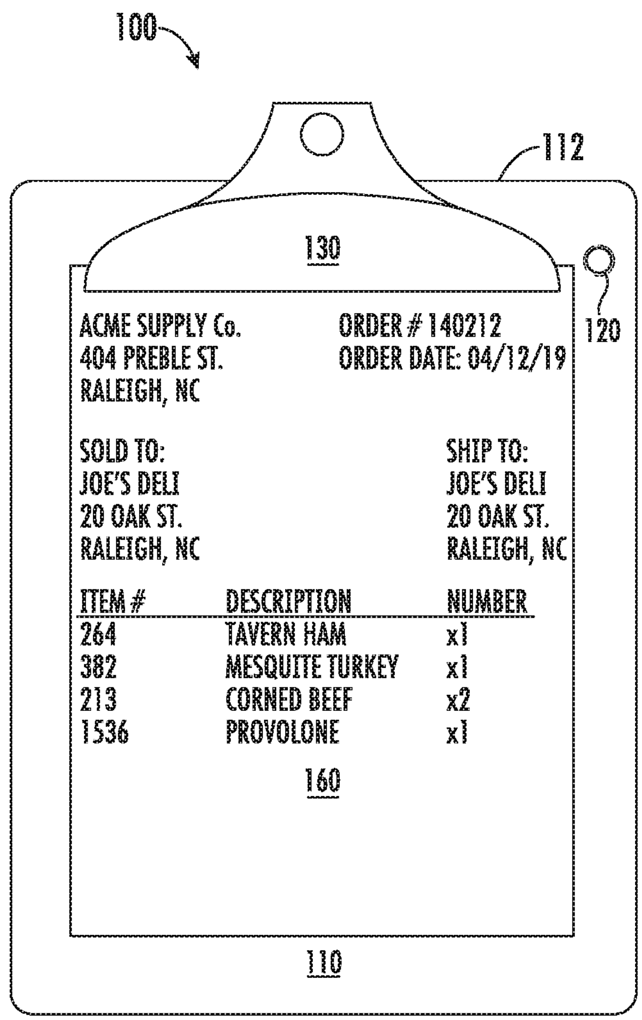
Figure 8:
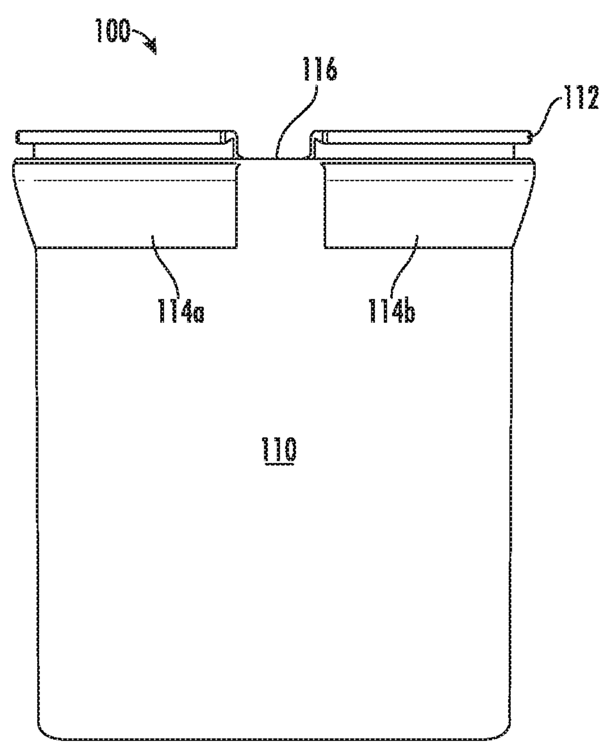
Figure 9:
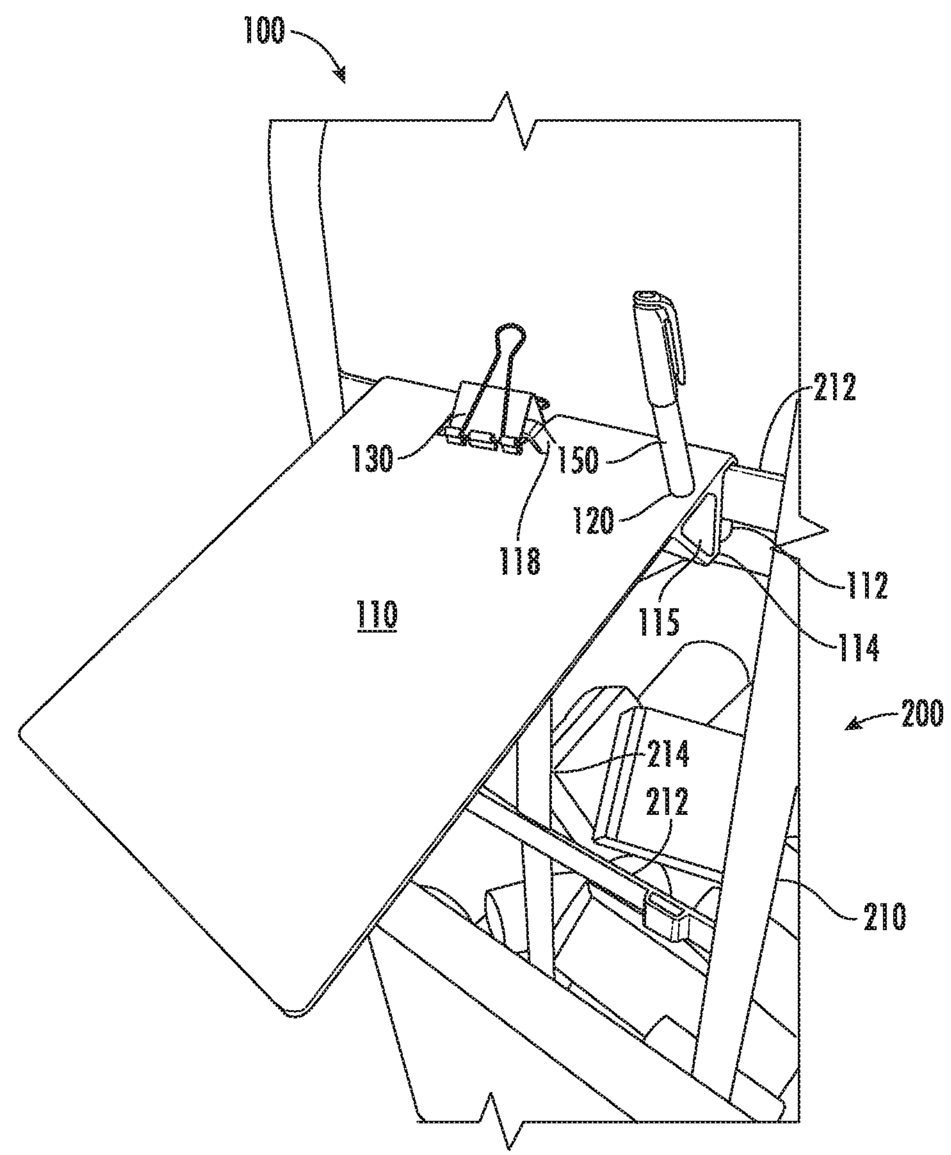
Figure 10:
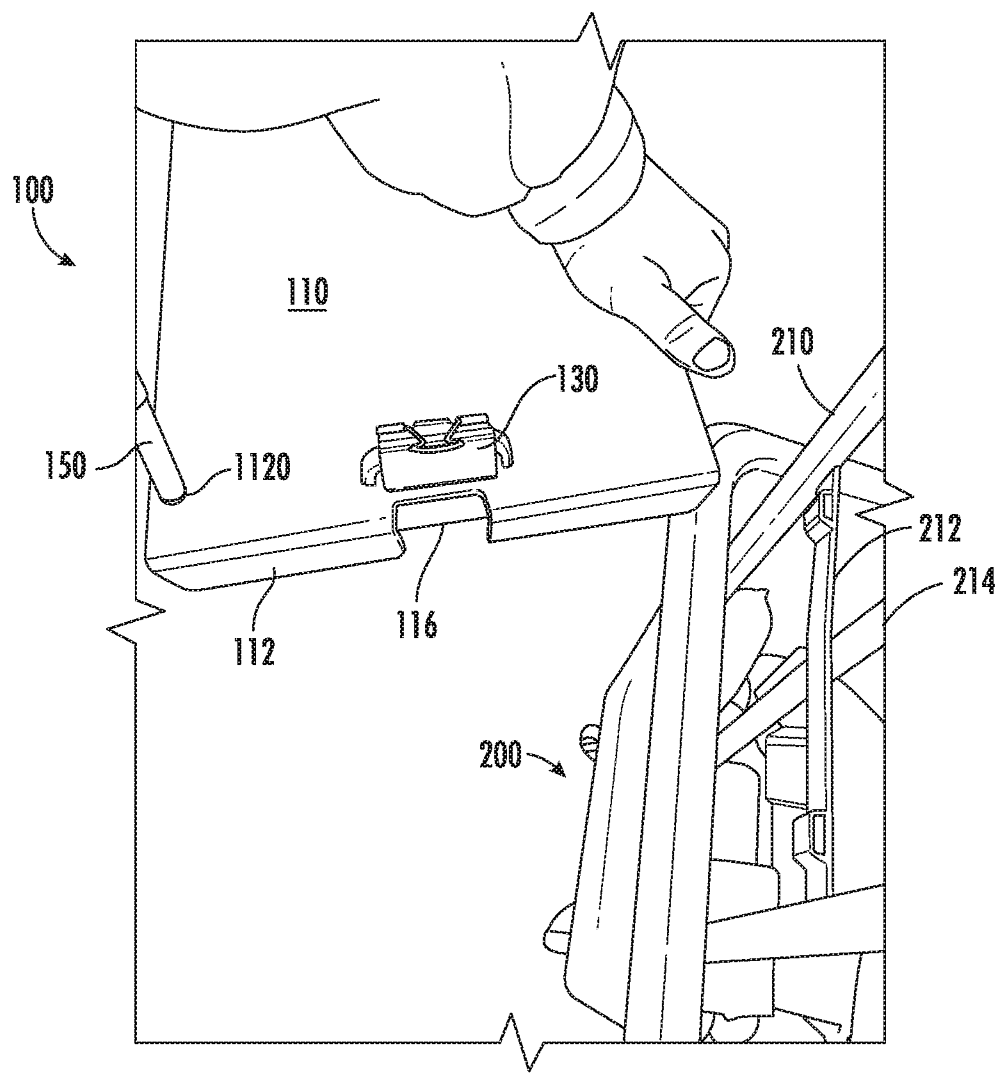
Figure 11:
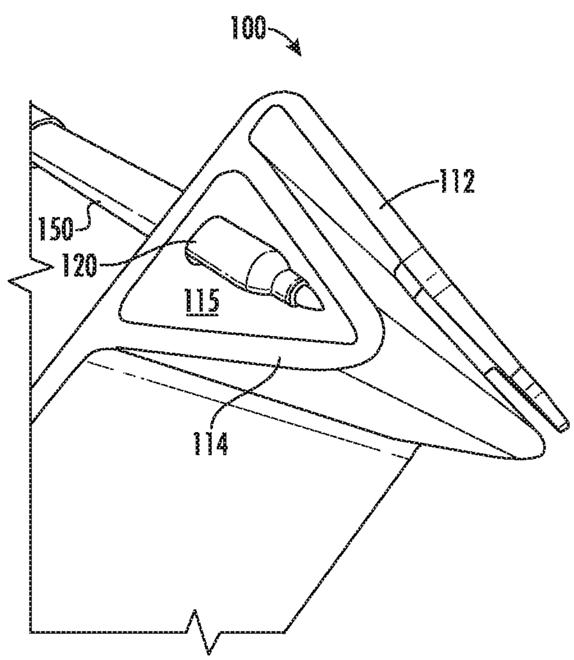
Figure 12:
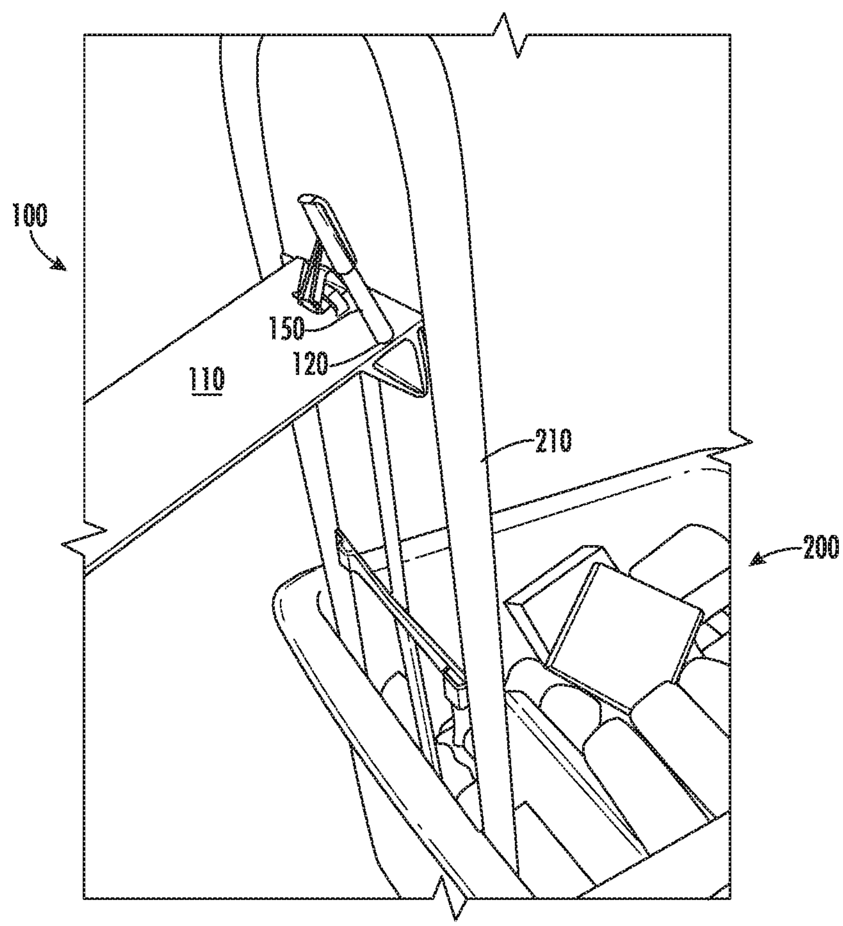
Figure 13:
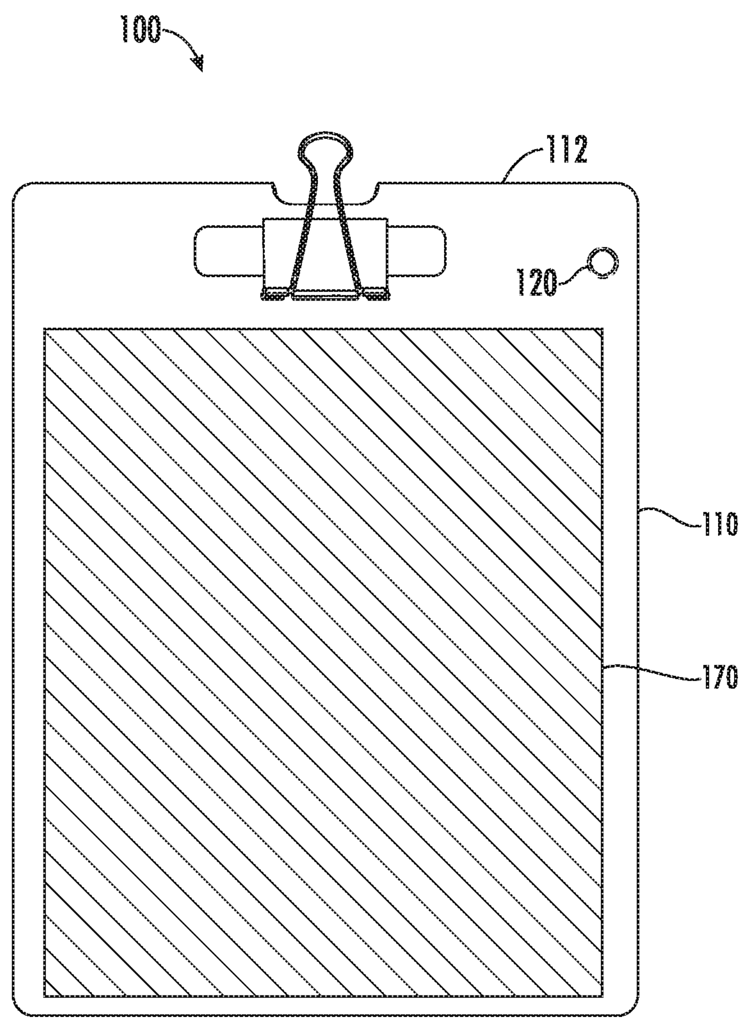
Figure 14:
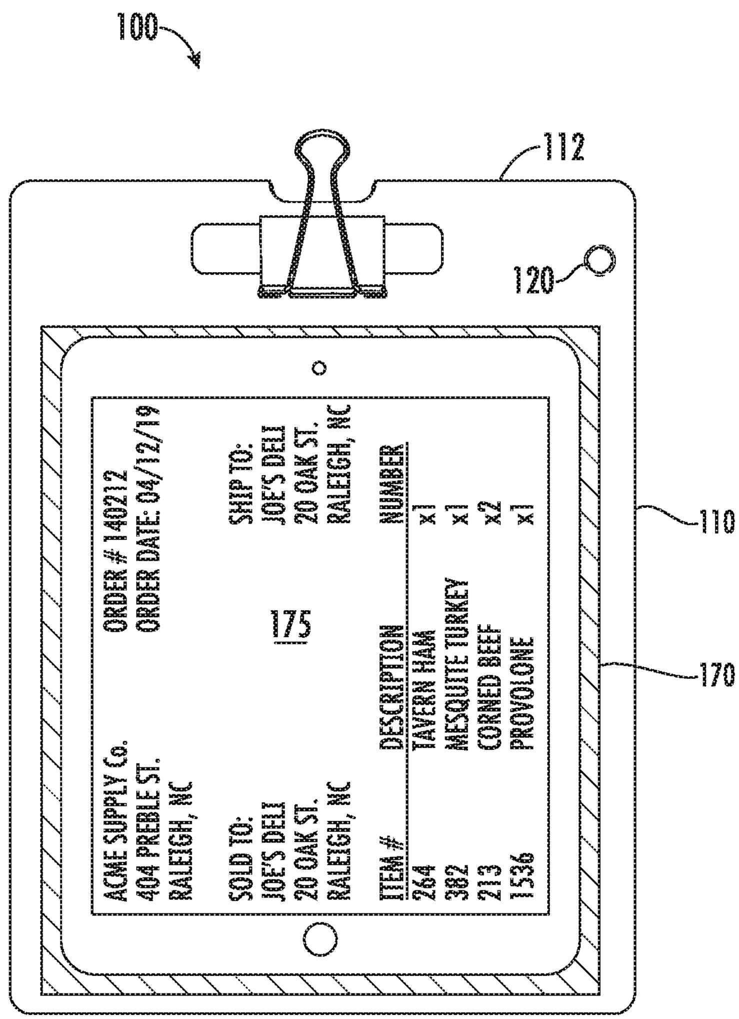
Figure 15:
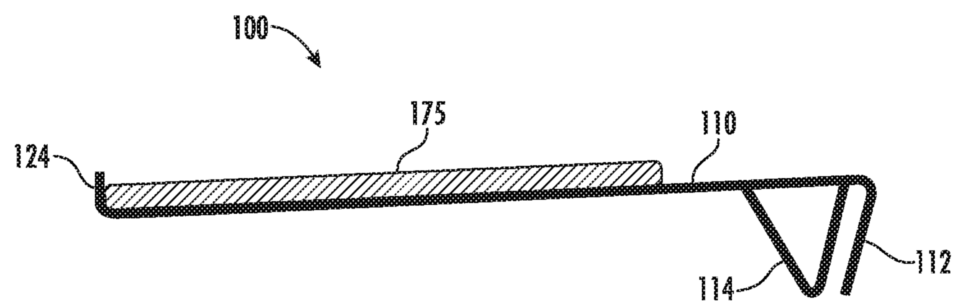
Figure 16:
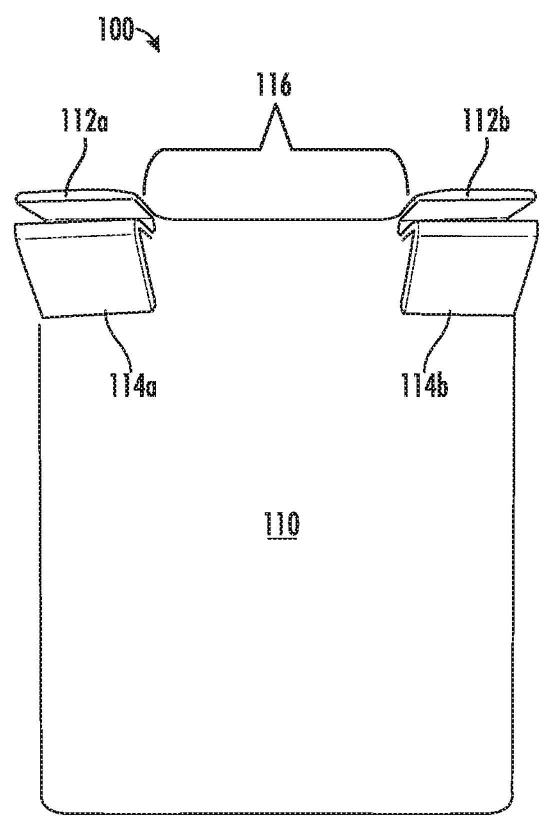
Figure 17:
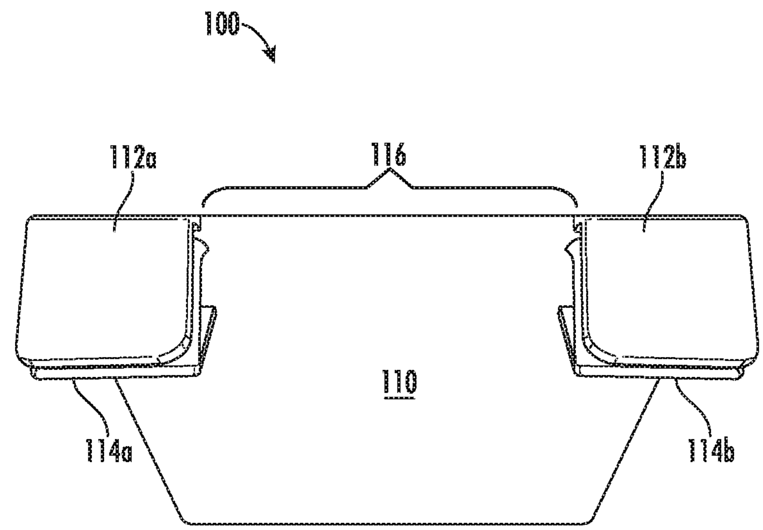
Figure 18:
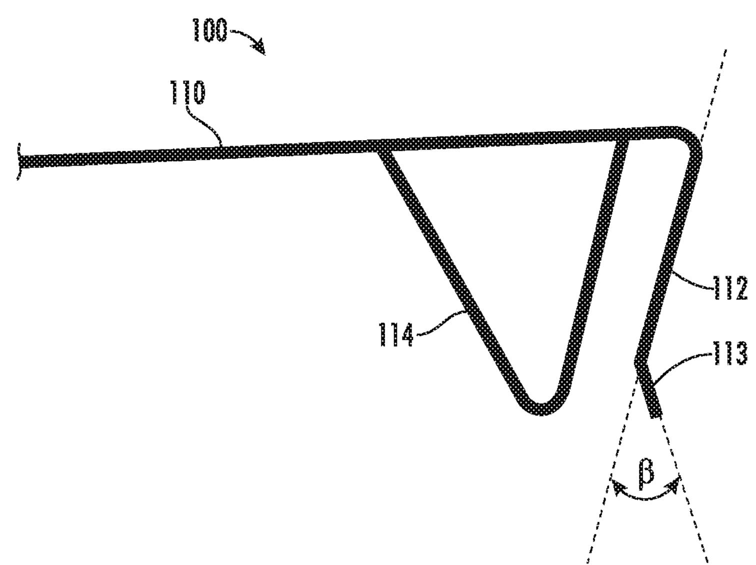
Figure 19:
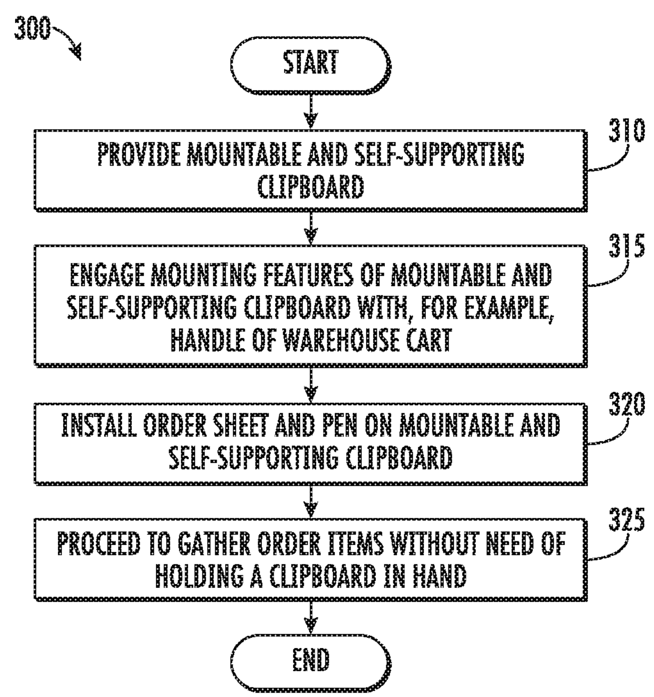

Having thus described the subject matter of the invention in general terms, reference will now be made to the accompanying drawings, which are not necessarily drawn to scale, and wherein:

FIG. 1, FIG. 2, FIG. 3, and FIG. 4 illustrate a top view, a side view, a bottom view, and an end view, respectively, of the mountable and self-supporting tray in accordance with an embodiment of the invention;

FIG. 5A and FIG. 5B illustrate side views showing more details of the of the mountable and self-supporting tray in accordance with an embodiment of the invention;

FIG. 6 and FIG. 7 illustrate examples of the mountable and self-supporting tray holding an order sheet in accordance with an embodiment of the invention;

FIG. 8 illustrates a bottom view of another example of mountable and self-supporting tray that includes a two-piece support member in accordance with an embodiment of the invention;

FIG. 9, FIG. 10, FIG. 11, and FIG. 12 illustrates examples of the mountable and self-supporting tray mounted on the handle of a cart in accordance with an embodiment of the invention;

FIG. 13 and FIG. 14 illustrates an example of the mountable and self-supporting tray that includes an antiskid pad on the working surface thereof in accordance with an embodiment of the invention;

FIG. 15 illustrates a side view of yet another example of the mountable and self-supporting tray that includes a lower edge plate in accordance with an embodiment of the invention;

FIG. 16 and FIG. 17 illustrates a bottom view and an end view, respectively, of yet another example of the mountable and self-supporting tray that includes a two-piece support member in accordance with an embodiment of the invention;

FIG. 18 illustrates a side view of still another example of the mountable and self-supporting tray that includes another configuration of the upper edge plate in accordance with an embodiment of the invention; and FIG. 19 illustrates a flow diagram of an example of a method of using the mountable and self-supporting tray in accordance with an embodiment of the invention.

DETAILED DESCRIPTION

The subject matter of the invention now will be described more fully hereinafter with reference to the accompanying drawings, in which some, but not all embodiments of the subject matter of the invention are shown. Like numbers refer to like elements throughout. The subject matter of the invention may be embodied in many different forms and should not be construed as limited to the embodiments set forth herein; rather, these embodiments are provided so that this disclosure will satisfy applicable legal requirements. Indeed, many modifications and other embodiments of the subject matter of the invention set forth herein will come to mind to one skilled in the art to which the subject matter of the invention pertains having the benefit of the teachings presented in the foregoing descriptions and the associated Drawings. Therefore, it is to be understood that the subject matter of the invention is not to be limited to the specific embodiments disclosed and that modifications and other embodiments are intended to be included within the scope of the appended claims.

In some embodiments, the subject matter of the invention provides a mountable and self-supporting tray, such as a clipboard, and method. In one example, the tray can be mounted and self-supported on a cart, such as on a U-frame warehouse style cart for pulling warehouse orders and the like. Accordingly, the mountable and self-supporting tray provides handsfree utilization.

In some embodiments, the mountable and self-supporting tray and method may provide a main plate, which provides a working surface, and a downward-facing edge plate and a support member at the upper end of the main plate that may be used for engaging with and being self-supported on another structure, such as, but not limited to, a cart, for example a U-frame cart, or other similar type cart or structure.

In some embodiments, the mountable and self-supporting tray and method may provide a clamp/clip mechanism, such as, but not limited to, a clipboard style clamp or a separate binder style clip, for holding paper and/or the like on the main plate.

In some embodiments, the mountable and self-supporting tray and method may provide an opening in the main plate for holding a writing/marking instrument.

In some embodiments, the mountable and self-supporting tray and method may provide one or more mechanisms to help secure a mobile device, such as a tablet device or mobile phone, on the main plate. Examples of these mechanisms may include, but are not limited to, an antiskid pad on the main plate and/or an upward-facing edge plate at a lower end of the main plate.

Further, the mountable and self-supporting tray and method may be adapted for any application that processes information and that would benefit from a hands-free self-supporting clipboard.

Further, a method may be provided of using the mountable and self-supporting tray in a manner that allows handsfree utilization thereof.

Referring now to FIG. 1, FIG. 2, FIG. 3, and FIG. 4 is a top view, a side view, a bottom view, an end view, respectively, of the mountable and self-supporting tray 100 (or mountable tray 100). Additionally, FIG. 5 is side views showing more details of mountable tray 100. For example, mountable tray 100 may be a clipboard style tray, and may include a main plate 110, an upper edge plate 112 on one end of main plate 110, a support member 114 in relation to upper edge plate 112, a clearance notch 116 in upper edge plate 112. Mountable tray 100 may further include a securing mechanism 130 (such as a clamp or clip), a clip support 118, and/or one or more openings 120.

Main plate 110 provides a working surface of mountable tray 100. Together upper edge plate 112 and support member 114 provide a mechanism for installing and supporting mountable tray 100 on another structure, such as a cart (see FIG. 9 through FIG. 12). Main plate 110, and accordingly mountable tray 100, has an overall length L and an overall width W. In one non-limiting example, the length L may be about 13 inches and the width W may be about 10 inches. However, length L and width W may be less than or greater than about 13 inches and about 10 inches, respectively. Opening 120 may be provided for holding an instrument, such as a writing/marking instrument, e.g., a pen, pencil, marker, highlighter, permanent marker, a stylus (e.g., for application with a tablet device, mobile phone, and/or other smart device), or the like. Opening 120 may be located at any number of locations on mountable tray 100. In one example, opening 120 may be located at an upper corner of main plate 110, or any other suitable location. In one non-limiting example, opening 120 may have a diameter of about 0.5 inches (or other suitable diameter), and may be positioned (on center) a distance d1 from the top edge of main plate 110 and a distance d2 from the side edge of main plate 110. In one non-limiting example, the distance d1 may be about 1.5 inches and the distance d2 may be about 0.75 inches. However, d1 and d2 may be less than or greater than about 1.5 inches and about 0.75 inches, respectively. In another embodiment, mountable tray 100 may include more than one opening 120.

Clip support 118 may be a strip or bar that may be raised with respect to the working surface of main plate 110. Accordingly, there may be a space or gap between clip support 118 and the surface of main plate 110. A securing mechanism 130, such as a binder clip, clipboard style clamp, or the like, may be slipped under and over clip support 118 and available for holding paper, etc., on mountable tray 100 (see FIG. 1 and FIG. 2). In one non-limiting example, clip support 118 may be about 3.5 inches long, or any other suitable length for holding securing mechanism 130 in place. In an alternative embodiment, securing mechanism 130 may be attached and secured directly to the mountable tray 100, by welding, adhesive, rivet, screw, nut/bolt, or any other suitable mechanism and/or technique.

Figure 1:
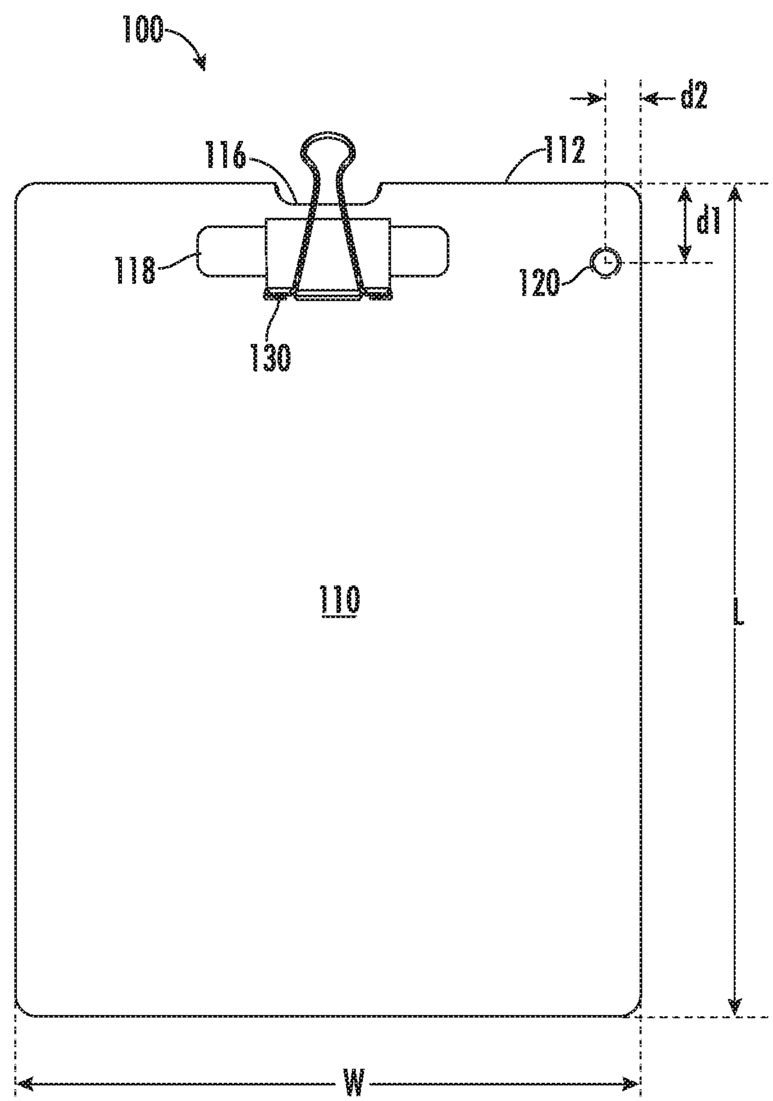
Figure 2:
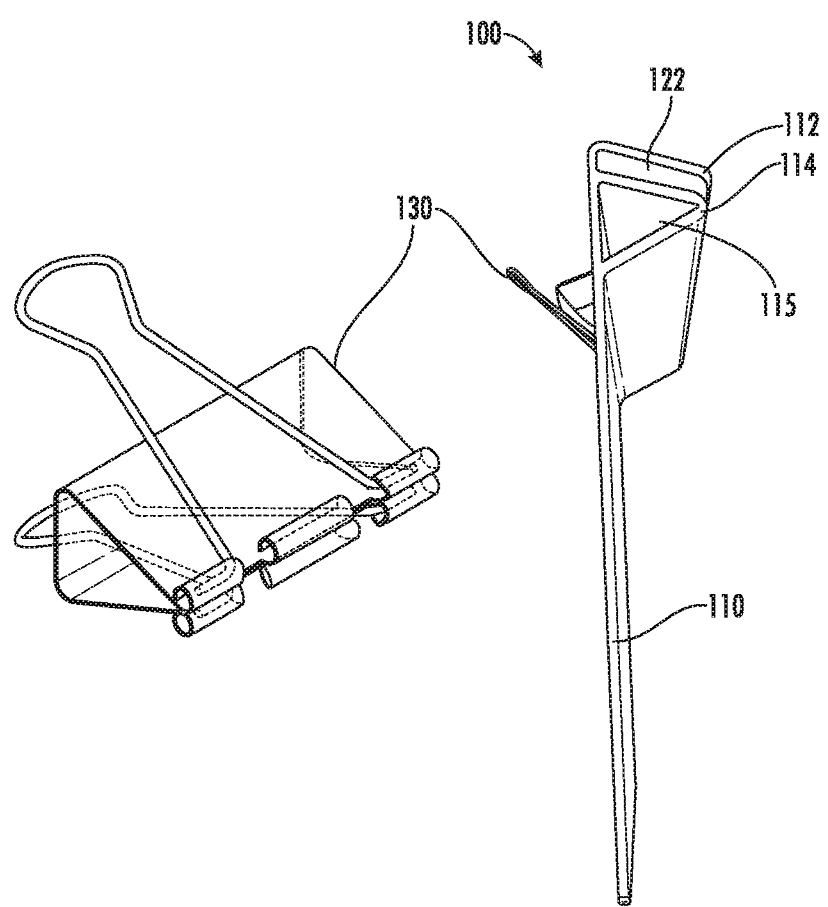
Figure 3:
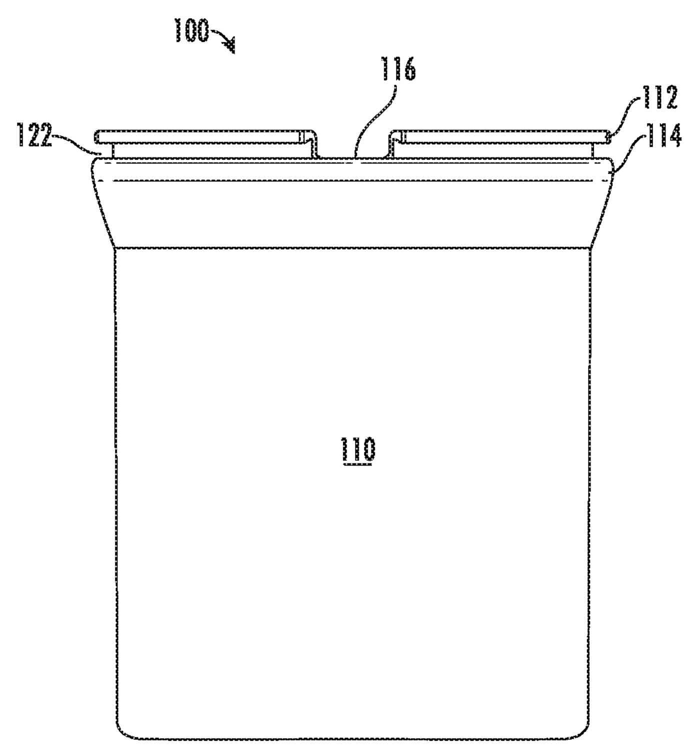
Figure 4:
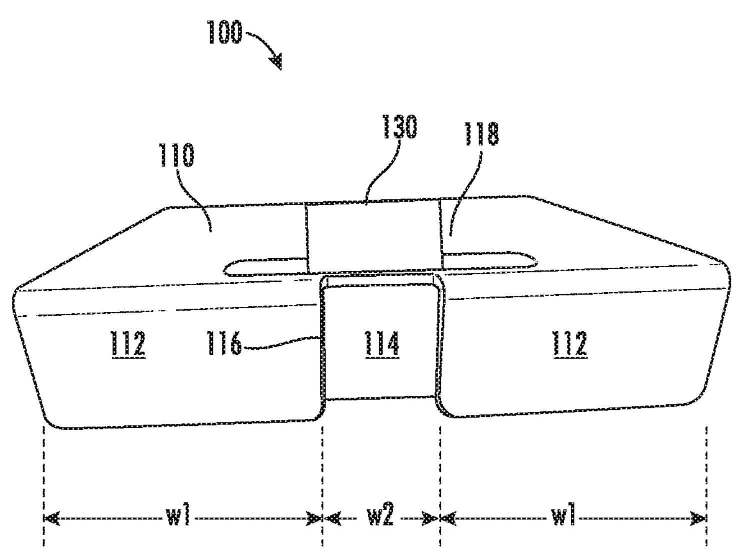

Upper edge plate 112 may be a downward-extending plate at the upper end of main plate 110 as shown in FIG. 2 through FIG. 5. Clearance notch 116, may be provided at about a center of upper edge plate 112 as shown in FIG. 1, FIG. 3, and FIG. 4. In one example, and referring now to FIG. 4, upper edge plate 112 on each side of clearance notch 116 may have a width w1 and clearance notch 116 may have a width w2. In one non-limiting example, the width w1 may be about 4 inches and the width w2 may be about 2 inches. However, w1 and w2 may be less than or greater than about 4 inches and 2 inches, respectively.

Support member 114 may be provided in relation to upper edge plate 112 as shown, for example, in FIG. 2 through FIG. 5. In one example, support member 114 may have a generally V-shaped profile. Referring now to FIG. 5, support member 114 may have an inner space 115 to which opening 120 may be substantially aligned. Accordingly, when a writing instrument is placed in opening 120, the support member 114 preferably engages the tip thereof and prevents the writing instrument from falling through (see FIG. 9 through FIG. 12). Support member 114 is not limited to a V-shaped profile. Support member 114 can be any profile, such as U-shaped, box-shaped, etc.

Referring now again to FIG. 5, upper edge plate 112 may be a downward-facing plate with respect to main plate 110. Additionally, the face of support member 114 that is nearest upper edge plate 112 may be substantially parallel to upper edge plate 112. Further, there may be a gap 122 between upper edge plate 112 and the face of support member 114 that is nearest upper edge plate 112. In one non-limiting example, gap 122 may be about 0.5 inches (or other suitable distance). Upper edge plate 112 and support member 114 may have an overall height h1. In one non-limiting example, the height h1 may be about 2 inches (or other suitable height). Further, support member 114 has a width w3. In one non-limiting example, the width w3 may be about 1.5 inches (or other suitable width). Additionally, substantially all plate members that form mountable tray 100 may have a thickness t. In one non-limiting example, the thickness t may be about 0.125 inches. However, in other examples thickness t may be more or less than 0.125 inches. In still further embodiments, some or all of the plate members may have differing thicknesses t.

Additionally, upper edge plate 112 and the face of support member 114 that is nearest upper edge plate 112 may be set at an angle α with respect to the plane of main plate 110. The angle α, in a non-limiting example, may be in the range of about 30 degrees to about 90 degrees depending on the desired working angle of mountable tray 100 when installed on a particular structure, such as a U-frame warehouse cart (see FIG. 9 through FIG. 12). However, in other examples angle α may be more or less than the range of about 30 degrees to about 90 degrees.

Mountable tray 100 may be formed of any lightweight, rigid, and strong material that is capable of handling harsh environments. For example, mountable tray 100 may be formed of aluminum, stainless steel, plastic (e.g., poly (methyl methacrylate) (PMMA), polyvinyl chloride (PVC)), and/or any other suitable material. To ensure adequate strength, the thickness t may vary depending on the material used.

Referring now to FIG. 6 and FIG. 7 is examples of the mountable and self-supporting tray 100 holding a paper order sheet 160. Namely, FIG. 6 shows order sheet 160 being held by securing mechanism 130, such as a standard binder clip or clamp that may be provided separately from mountable tray 100 and engaged with clip support 118. In another example, FIG. 7 shows a securing mechanism 130 as a clamp, such as a standard clipboard style clamp, secured to main plate 110 for holding order sheet 160 on main plate 110.

Referring now to FIG. 8 is a bottom view of another example of the mountable and self-supporting tray 100 that includes a two-piece support member 114 (e.g., support members 114*a*, 114*b*). In one example, there may be a gap between support members 114*a*, 114*b* and wherein the size of this gap may substantially correspond to clearance notch 116 in upper edge plate 112. In this non-limiting example, each of the support members 114*a*, 114*b* may be about 4 inches wide and the gap therebetween may be about 2 inches wide. However, in other examples support members 114*a*, 114*b* may be more or less than about 4 inches wide, and the gap therebetween may be more or less than about 2 inches wide.

Referring now to FIG. 9, FIG. 10, FIG. 11, and FIG. 12 are examples of the mountable and self-supporting tray 100 mounted on the handle of a cart 200. In this example, cart 200 may be a U-frame cart that has a handle 210. Alternatively, cart 200 may be any number of structures or carts, which may be used for transporting items. Handle 210 may include multiple horizontal members 212 and a vertical member 214 and wherein mountable tray 100 may be installed on any one of the horizontal members 212. Namely, when mountable tray 100 is in use, clearance notch 116 in upper edge plate 112 preferably aligns with vertical member 214 of handle 210. At the same time, the horizontal member 212 preferably fits into gap 122 between upper edge plate 112 and support member 114 until mountable tray 100 is resting atop the horizontal member 212 of handle 210 of cart 200. Additionally, FIG. 9, FIG. 10, FIG. 11, and FIG. 12 show a writing/marking instrument 150, such as a pen, held in opening 120 of mountable tray 100.

FIG. 9, FIG. 10, FIG. 11, and FIG. 12 show mountable tray 100 installed on the outside of handle 210 and facing away from, for example a collection bin loaded thereon. However, in another example, mountable tray 100 may be installed on the inside of handle 210 and facing toward, for example a collection bin loaded thereon in. In this example, the embodiment of mountable tray 100 shown in FIG. 8 that includes the two-piece support member 114 may be most suitable.

Instead of using a paper order sheet, such as, for example, as order sheet 160 shown in FIG. 6 and FIG. 7, a user may be using a mobile device to process information. In this scenario, the mountable and self-supporting tray 100 may include an antiskid pad 170 on the working surface thereof as shown in FIG. 13 and FIG. 14. The antiskid pad 170 may be useful for preventing a mobile device, such as a mobile device 175 shown in FIG. 14, from slipping off of mountable tray 100 when in use. Mobile device 175 may be any smart mobile device, such as, but not limited to, a tablet device, laptop, or mobile phone.

Additionally, and referring now to FIG. 15, in place of or in combination with antiskid pad 170, an end edge plate 124 may be provided on the lower end of main plate 110 to help ensure that a mobile device (e.g., mobile device 175) can be held secure on mountable tray 100. In this example, end edge plate 124 may be an upward-extending plate. For example, end edge plate 124 may be an upward-extending plate set, in one non-limiting example, at about 90 degrees with respect to main plate 110, and in another non-limiting example, in the range of about 0.25 inches to about 0.5 inches high. However, end edge plate 124 may be set less than or greater than about 90 degrees with respect to main plate 110, and may be less than or greater than about 0.25 inches to about 0.5 inches high. Optionally, in place of or in combination with end edge plate 124, one or two upward-extending side edge plates (not shown) may be provided in similar fashion as end edge plate 124.

Referring now to FIG. 16 and FIG. 17 is a bottom view and an end view, respectively, of yet another example of the mountable and self-supporting tray 100 that includes another example of a two-piece support member 114 (e.g., support members 114*a*, 114*b*). The example shown in FIG. 16 and FIG. 17 is another variation of the example shown in FIG. 8. In this example, there may be a gap between support members 114*a*, 114*b* and wherein the size of this gap may substantially correspond to clearance notch 116 in upper edge plate 112. Further, the two segments of upper edge plate 112 are shown here as upper edge plates 112*a*, 112*b*. In this example, the width of clearance notch 116 between upper edge plates 112*a*, 112*b* may be, in one non-limiting example, in the range of about 6 inches. Accordingly, in this example, each of the support members 114*a*, 114*b* may be, in one non-limiting example, in the range of about 2 inches wide and the gap therebetween may be in the range of about 6 inches wide. However, it is within the scope of the disclosed invention that the width of clearance notch 116 between upper edge plates 112*a*, 112*b* may be less than or greater than about 6 inches; and it is further contemplated that each of the support members 114*a*, 114*b* may be less than or greater than about 2 inches wide and the gap therebetween may be less than or greater than about 6 inches wide.

Referring now to FIG. 18 is a side view of still another example of the mountable and self-supporting tray 100 that includes another configuration of upper edge plate 112. In this example, upper edge plate 112 may include a flared segment 113. For example, flared segment 113 may be, in one non-limiting example, at about the lower 4-5 mm portion (or other suitable portion) of upper edge plate 112 and may be flared outward at an angle β with respect to the plane of upper edge plate 112. The angle β may be, in one non-limiting example, about 45 degrees. Angle β may be less than or greater than 45 degrees. Flared segment 113 may be provided in upper edge plate 112 to aid in easy alignment and attachment of mountable and self-supporting tray 100 to, for example, handle 210 of cart 200. Namely, flared segment 113 of upper edge plate 112 may provide a slightly wider opening at the mouth between upper edge plate 112 and support member 114. Any of the other embodiments (e.g., as shown in FIGS. 3, 8) of upper edge plate 112 may include flared segment 113.

Referring now to FIG. 19 is a flow diagram of an example of a method 300 of using the mountable and self-supporting tray 100 in a substantially handsfree manner. Method 300 may include, but is not limited to, the following steps.

At a step 310, a mountable and self-supporting tray is provided. For example, the mountable and self-supporting tray 100 as described hereinabove with reference to FIG. 1 through FIG. 18 is provided.

At a step 315, the mounting features of the mountable and self-supporting tray may be engaged with, for example, the handle of a cart. For example, mountable tray 100 may be installed on cart 200 as shown in FIG. 9, FIG. 10, FIG. 11, and FIG. 12. In this example, cart 200 may be a U-frame warehouse style cart having handle 210 and wherein clearance notch 116 in upper edge plate 112 may be preferably aligned with vertical member 214 of handle 210. At the same time, the horizontal member 212 may be fitted into gap 122 between upper edge plate 112 and support member 114 until mountable tray 100 is resting atop the horizontal member 212 of handle 210 of cart 200.

At a step 320, the order sheet, and optionally a writing/marking instrument, e.g., pen, may be installed on the mountable and self-supporting tray. In one example, order sheet 160 is placed on main plate 110 and held using securing mechanism (clip/clamp) 130 as shown in FIG. 6 or FIG. 7. Further, writing/marking instrument 150 may be installed in opening 120 in main plate 110. In another example, instead of using a paper order sheet and pen, the user may use a mobile device (see FIG. 14 and FIG. 15), and optionally a stylus for processing information.

At a step 325, the user may proceed to gather order items without need of holding a clipboard in hand. For example, the user may proceed to gather order items without need of holding in hand the mountable and self-supporting tray 100. Rather, mountable tray 100 may be mounted and self-supported on, for example, cart 200.

While method 300 is described with respect to a warehouse application and using mountable and self-supporting tray 100 with a warehouse cart, this is exemplary only. The mountable and self-supporting tray 100 can be adapted for any application that processes information and that would benefit from a handsfree clipboard. For example, the mountable and self-supporting tray 100 can be adapted for use in a shipping and/or delivery service application. Further, the mountable and self-supporting tray 100 may be adapted to hold other items, such as, but not limited to, a box cutter, a flashlight, stylus, and/or other item or items useful in such a field of use.

In summary and referring again to FIG. 1 through FIG. 19, a mountable and self-supporting tray 100 and method 300 is provided. Mountable tray 100 may be mounted and self-supported on a cart, and in one example, useful for pulling warehouse orders. Accordingly, mountable tray 100 provides handsfree utilization.

Further, the mountable and self-supporting tray 100 and method 300 provide a working surface (e.g., main plate 110) and mechanisms (e.g., downward-facing upper edge plate 112 and support member 114) for engaging with and being self-supported on another structure, such as, but not limited to, a cart, such as a U-frame warehouse cart.

Further, the mountable and self-supporting tray 100 and method 300 provide a securing mechanism, such as, but not limited to, securing mechanism 130 (e.g., standard clipboard clamp, binder style clip, or any other suitable device or mechanism, for holding paper on the working surface (e.g., main plate 110). Additionally, the mountable and self-supporting tray 100 may include an opening 120 in main plate 110 for holding a writing/marking instrument.

Further, the mountable and self-supporting tray 100 and method 300 may provide one or more mechanisms to help secure a mobile device, such as a tablet device or mobile phone, on main plate 110. Examples of these mechanisms may include, but are not limited to, an antiskid pad on main plate 110, an upward-extending lower edge plate 124 at the lower end of main plate 110, and/or upward-extending side edge plates (not shown).

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A mountable tray comprising:

a) a main plate having a top surface, a bottom surface, a top edge, a bottom edge spaced apart from and parallel with the top edge, a first side edge, and a second side edge spaced apart from and parallel with the first side edge;

b) an upper edge plate extending downward from at least a portion of the top edge of the main plate bottom surface, wherein the upper edge plate comprises a cutout portion formed therein at a center point of the upper edge plate;

c) a support member formed on the bottom surface of the main plate and proximate to the upper edge plate, wherein the support member is substantially parallel with and spaced a distance apart from the upper edge plate;

d) a securing mechanism disposed at an upper portion of the top surface of the main plate; and wherein the support member comprises a cutout portion that is substantially the same size and substantially aligns with the cutout portion of the upper edge plate.

2. The tray of claim 1, wherein the securing mechanism comprises one of a clip or a clamp.

3. The tray of claim 2, further comprising a mounting support disposed on the top surface of the main plate, wherein the mounting support is configured to secure the clip or clamp to the top surface of the main plate.

4. The tray of claim 3, wherein the mounting support is disposed at a top portion of the top surface of the main plate.

5. The tray of claim 1, further comprising one or more openings formed through the main plate.

6. The tray of claim 5, wherein the one or more openings are configured for holding a marking instrument.

7. The tray of claim 6, wherein the marking instrument comprises any one of a pen, pencil, marker, highlighter, or stylus.

8. The tray of claim 5, wherein the one or more openings are disposed at one or both of a first or a second top corner region of the main plate.

9. The tray of claim 5, wherein the one or more openings substantially align with an inner space formed by a profile of the support member, and wherein the profile of the support member is configured such that when a marking instrument is placed in the one or more openings the profile of the support member prevents the marking instrument from falling completely through the one or more openings.

10. The tray of claim 1, wherein the cutout portion of the upper edge plate extends laterally an equal distance in opposite directions from the center point of the upper edge plate.

11. The tray of claim 1, wherein the upper edge plate and support member are configured to install and support the main plate to a separate structure.

12. The tray of claim 11, wherein the separate structure comprises a moveable cart.

13. The tray of claim 1, wherein the support member comprises one of a generally V-shaped, U-shaped, or rectangular-shaped profile.

14. The tray of claim 1, wherein the upper edge plate and a first plate of the support member that is adjacent to and parallel with the upper edge plate are set at an angle in a range of 30 degrees to 90 degrees with respect to a plane of the main plate.

15. The tray of claim 1, wherein the cutout portion of the support member extends laterally an equal distance in opposite directions from the center point of the support member.

16. The tray of claim 1, further comprising an antiskid pad disposed on at least a portion of the top surface of the main body.

17. The tray of claim 1, further comprising a bottom edge end plate extending generally upward from at least a portion of the bottom edge of the main plate top surface.

18. The tray of claim 1, wherein the upper edge plate comprises a flared segment at a lower portion of the upper edge plate, and wherein the flared segment flares outward with respect to a plane of upper edge plate.

19. The tray of claim 18, wherein a gap between the flared segment of the upper edge plate and a portion of the support member directly opposing the flared segment is greater in width than a gap between a non-flared segment of the upper edge plate and a portion of the support member directly opposing the non-flared segment of the upper edge plate.

20. A mountable tray comprising:

a) a main plate having a top surface, a bottom surface, a top edge, a bottom edge spaced apart from and parallel with the top edge, a first side edge, and a second side edge spaced apart from and parallel with the first side edge;

b) an upper edge plate extending downward from at least a portion of the top edge of the main plate bottom surface, wherein the upper edge plate comprises a cutout portion formed therein at a center point of the upper edge plate;

c) a support member formed on the bottom surface of the main plate and proximate to the upper edge plate, wherein the support member is substantially parallel with and spaced a distance apart from the upper edge plate; and wherein the support member comprises a cutout portion that is substantially the same size and substantially aligns with the cutout portion of the upper edge plate.

21. A method of using a mountable tray, the method comprising:

a) providing a mountable tray, comprising:

i) a main plate having a top surface, a bottom surface, a top edge, a bottom edge spaced apart from and parallel with the top edge, a first side edge, and a second side edge spaced apart from and parallel with the first side edge;

ii) an upper edge plate extending downward from at least a portion of the top edge of the main plate, wherein the upper edge plate comprises a cutout portion formed therein at a center point of the upper edge plate;

iii) a support member formed on the bottom surface of the main plate and proximate to the upper edge plate, wherein the support member is substantially parallel with and spaced a distance apart from the upper edge plate;

vi) a securing mechanism disposed at an upper portion of the top surface of the main plate; and wherein the support member comprises a cutout portion that is substantially the same size and substantially aligns with the cutout portion of the upper edge plate; and b) installing the mountable tray to a separate structure via the upper edge plate and support member.

* * * * *